United States Patent [19]
Drumm

[11] Patent Number: 5,426,450
[45] Date of Patent: Jun. 20, 1995

[54] HANDS-FREE HARDWARE KEYBOARD
[75] Inventor: Donald E. Drumm, Billerica, Mass.
[73] Assignee: Wang Laboratories, Inc., Lowell, Mass.
[21] Appl. No.: 318,031
[22] Filed: Oct. 4, 1994

Related U.S. Application Data

[63] Continuation of Ser. No. 93,293, Jul. 16, 1993, abandoned, which is a continuation of Ser. No. 517,347, May 1, 1990, abandoned.

[51] Int. Cl.⁶ .............................................. G09G 5/00
[52] U.S. Cl. .................................. 345/168; 345/170; 345/158; 341/22
[58] Field of Search ................. 345/158, 168, 170; 341/21, 22, 27; 364/709.01, 709.06, 709.08, 709.09

[56] References Cited

U.S. PATENT DOCUMENTS

| | | | |
|---|---|---|---|
| 4,400,697 | 8/1983 | Currie et al. | 340/711 |
| 4,524,348 | 6/1985 | Lefkowitz | 340/706 |
| 4,565,999 | 1/1986 | King et al. | 340/706 |
| 4,567,479 | 1/1986 | Boyd | 340/709 |
| 4,642,610 | 2/1987 | Smith, III | 341/21 |
| 4,713,535 | 12/1987 | Rhoades | 341/21 |
| 4,746,913 | 5/1988 | Volta | 341/21 |
| 4,754,268 | 6/1988 | Mori | 340/710 |
| 4,862,172 | 8/1989 | Ross | 340/709 |
| 4,988,981 | 1/1991 | Zimmerman et al. | 340/709 |

FOREIGN PATENT DOCUMENTS

0312095A2 4/1989 European Pat. Off. .
2575560 7/1986 France .

OTHER PUBLICATIONS

Nelson, P. J., et al., "The MOD Keyboard," IEEE Micro, pp. 7–17, Aug. 1983.

Primary Examiner—Richard Hjerpe
Attorney, Agent, or Firm—Kenneth L. Milik

[57] ABSTRACT

A computer system is provided which allows keyboard access in a hands-free environment. An orientation sensor is mounted on a headset and provides a cartesian positional input to an interface. The device functions in either a cursor control mode or a keyboard simulation mode. In keyboard simulation mode, positional inputs are converted to keyboard input codes which are input to a standard keyboard controller. The key codes generated are displayed to a user on an LED display. A microphone on the headset connects to voice control circuitry of the interface which allows input selections to be made through voice commands. A user locates the desired keyboard input by observing the LED display and selects the input with a vocal command. RAM memory storage of keyboard inputs allows the system to appear as a manual keyboard from the perspective of the keyboard controller.

37 Claims, 11 Drawing Sheets

HANDS-FREE HARDWARE KEYBOARD

This is a continuation of application Ser. No. 08/093,293, filed on Jul. 16, 1993, now abandoned, which is a continuation of Ser. No. 07/517,347, filed on May 1, 1990, now abandoned.

BACKGROUND OF THE INVENTION

There are various input devices (other than the cursor keys of a manual keyboard) which are known for positioning or controlling the movement of a cursor on a computer display screen. One of the more common in use is the conventional "mouse" device, in the form of a hand-sized housing which is moved over a flat desktop. Motion over the desktop is sensed by means of a mechanically rotating ball or optically reflective sensor, and digital data are generated which translate into corresponding motion of the cursor on the display screen. Other cursor positioning devices include the joystick, the graphics input tablet, consisting of a flat sensor pad and a hand-held pointing stylus, which translates the analog motion of the pointing stylus into digitized data used to control the location of the cursor on the display screen. Still other cursor movement devices rely on focused light sources, held by the user or fixed on the user's person, as on a pilot's helmet. As the user aims the light beam, sensors mounted around a display screen track the movement of the beam and translate this movement into a corresponding movement of the cursor on the display screen.

Devices such as those discussed above are basically effective, although they suffer from certain disadvantages. Most cursor positioning and controlling devices require a fixed, generally level surface upon which to operate, or must operate in conjunction with a stationary sensor of some type; that is, motion is sensed with respect to a fixed medium and positional data signals are generated and presented to a computer for translation into a corresponding cursor movement. The need for a fixed surface or stationary sensor constrains how the user may interact with the display device. The user must normally sit close to the display screen and be provided with ample level desk space for placement of the graphics tablet or movement of the "mouse." In the case of the stationary sensor, the user must confine movement to keep the light beam within range of the sensor array and aimed appropriately.

Still another disadvantage of many present-day cursor movement devices is that they require a level of manual dexterity for their effective use. This requirement has its greatest impact in the area of the physically disabled. To operate a computer, a disabled person may find that a mouse, a graphics tablet, or even a keyboard is useless to him.

Disadvantages of the prior art devices, such as the requirements of a flat desktop, aiming of a light source, or the manual dexterity of the user, were overcome in U.S. application Ser. No. 07/267,413, filed Nov. 4, 1988 and assigned to the assignee of the present invention. The cited application discloses an input device which does not require manual control, and which can be used by a physically disabled person.

SUMMARY OF THE INVENTION

Application Ser. No. 07/267,413 cited in the background section teaches a device which provides good hands-free control of an on-screen cursor. However, most software programs require keyboard inputs, and the device was limited to programs using on-screen cursor and select functions.

Software programs exist which provide software keyboards which "pop-up" on the display screen of a host computer. However, these programs are often incompatible with other software programs, particularly if special utility of the system video RAM is required. Furthermore, when the software keyboard is brought onto the display screen, it takes up much of the screen space, limiting user access to the screen.

In contrast to software keyboards, the present invention provides a hands-free keyboard input device which is transparent to accompanying software. No compatability problems arise because it is a hardware device and appears as a manual keyboard to a host computer. In addition, since it does not interfere with the display screen, no loss of screen space is suffered.

The present invention makes use of a computer system having a processor, a display screen and a keyboard input port for receiving inputs from a mechanical keyboard. An input device of the system provides a cartesian positional input to a controller in the system. The controller responds to the input signal by indicating individual keys on a key pad. The controller then provides an input to the keyboard input port to the processor.

In a preferred embodiment, a keyboard controller is provided which provides the input to the keyboard input port. The keyboard controller is a standard keyboard controller adapted to scan columns of mechanical key contacts and sense the state of the contacts. An key select input from the input device causes the controller to store in a random access memory a representation of a key indicated by the indicator. The keyboard controller periodically addresses the memory storage unit to read any new key representations. When a new key representation is read from the memory storage unit, the keyboard controller generates a corresponding input to the keyboard input port.

The transmission of key representations to and from the memory storage unit is controlled by buffer circuits which respond to an input from a user. A key select input causes the buffers to enable the storage of a key representation indicated by the key pad in the random access memory. The code is then read by the keyboard controller which generates a corresponding input to the keyboard input port. If the key representation designates a character key, the memory is cleared after being read by the keyboard controller. If the key representation designates a function key, additional indicators are used to indicated that a code representing a function key has been stored.

The key pad in the preferred embodiment has indicators which are a matrix of light emitting elements corresponding to a mechanical keyboard contact matrix. As the key representations change, the controller illuminates different elements to identify the particular key selection. The changes in the indicators of the array may be made to mimick the movement of the input device.

The preferred form of input device is an orientation sensor adapted to be worn as a headset, such as that presented in application Ser. No. 07/267,413. The orientation sensor modifies the positional input of the input device in response to changes in the spatial orientation of the input device. A microphone on the headset can be used to input key select functions by using voice commands which are processed in voice control circuitry of the computer system. In addition, an earphone attached to the headset may be provided to allow a user to receive audio signals generated by the computer system.

DETAILED DESCRIPTION OF A PREFERRED EMBODIMENT

Figure 1:
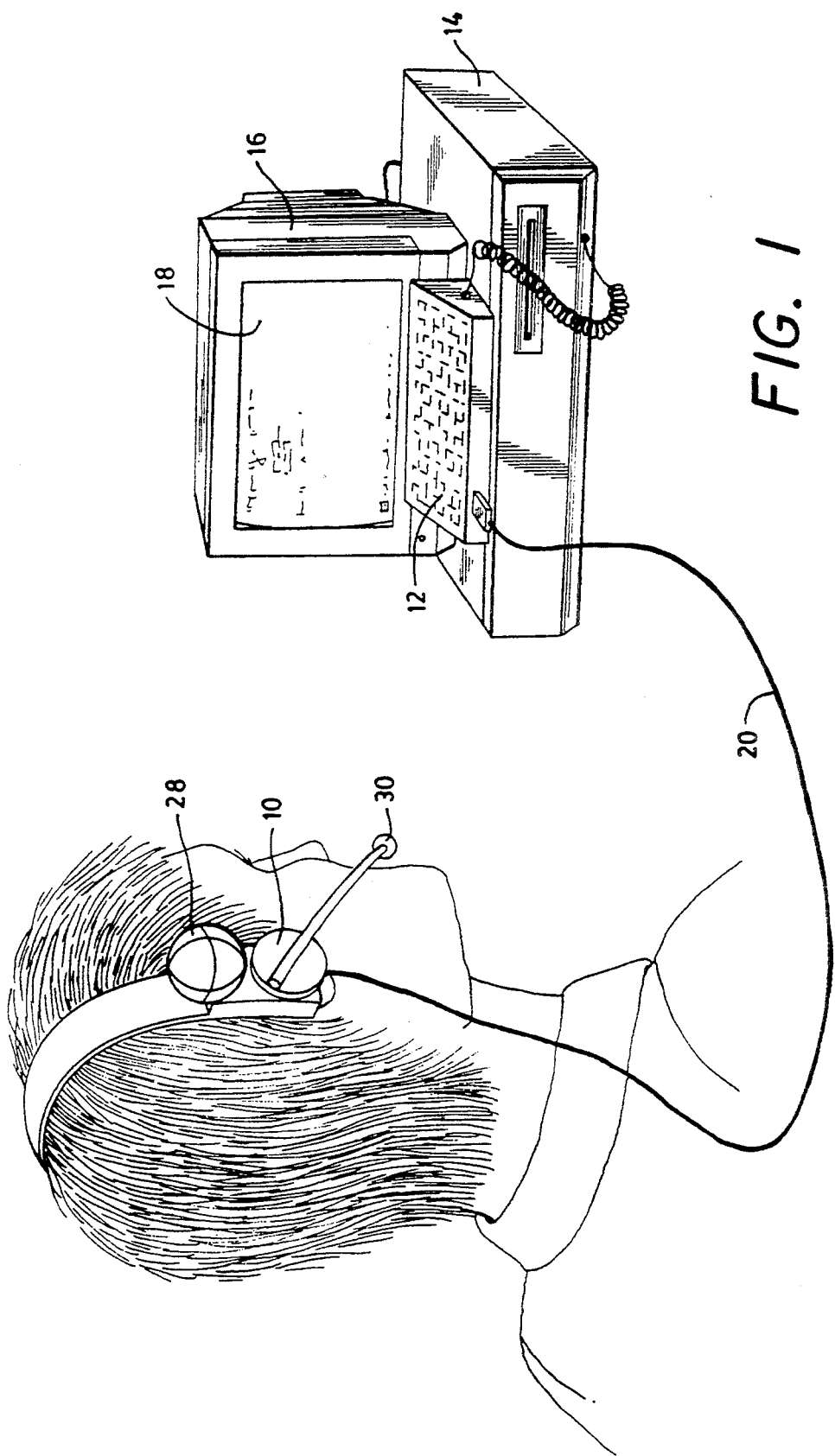
FIG. 1 is a perspective view of a user using the computer system of the present invention.

FIG. 1 illustrates a computer workstation making use of the present invention. The system includes a computer input device 10, a keyboard simulation interface 12, a computer 14, and a display terminal unit 16 having a display screen 18.

The computer input device 10 is in the form of a headset to be worn by the computer user. The input device 10 includes an orientation sensor 28 which provides an electrical analog signal that is related to the angle of tilt of the sensor 28 as determined in two axes. The user conveniently wears the device in the manner of a conventional audio headset. By controlling the orientation of the device by simple angular head movements, left-to-right, forward-to-back, or combinations of the two, the user effects a corresponding movement of a cursor displayed on the display screen 18. The computer input device 10 includes circuitry to digitize the analog signals generated by the orientation sensor for processing by the interface 12 and transmission to the computer 14. A microphone and preamplifier circuit are also included, which, together with voice control circuitry in the interface 12, allows the user to perform standard select functions.

A cable 20 carries digitized signals from the computer input device 10 to the interface 12. The interface 12 contains circuitry for receiving digitized signals from the computer input device 10 and translating those signals into control signals which can be interpreted by the computer 14, which in turn controls the display terminal unit 16. The interface 12 includes voice control circuitry which provides a speaker-independent voice detection of two primary sound types—fricative and voiced sounds. The interface 12 is programmed to simulate the operation of a standard cursor control device, and provides a standard RS-232C output to the computer 14.

In the preferred embodiment, the display screen 18 is a standard cathode ray tube, but any screen type may be used, including liquid crystal or projection displays.

Also in the preferred embodiment, the computer input device 10 simulates the functioning of a graphics input tablet. A user can therefore manipulate displayed data, make menu selections, or input graphic information on the display screen 18. Other devices may be easily simulated, such as a conventional "mouse." The manner in which the present invention operates will be discussed further in what follows.

Figure 2A:
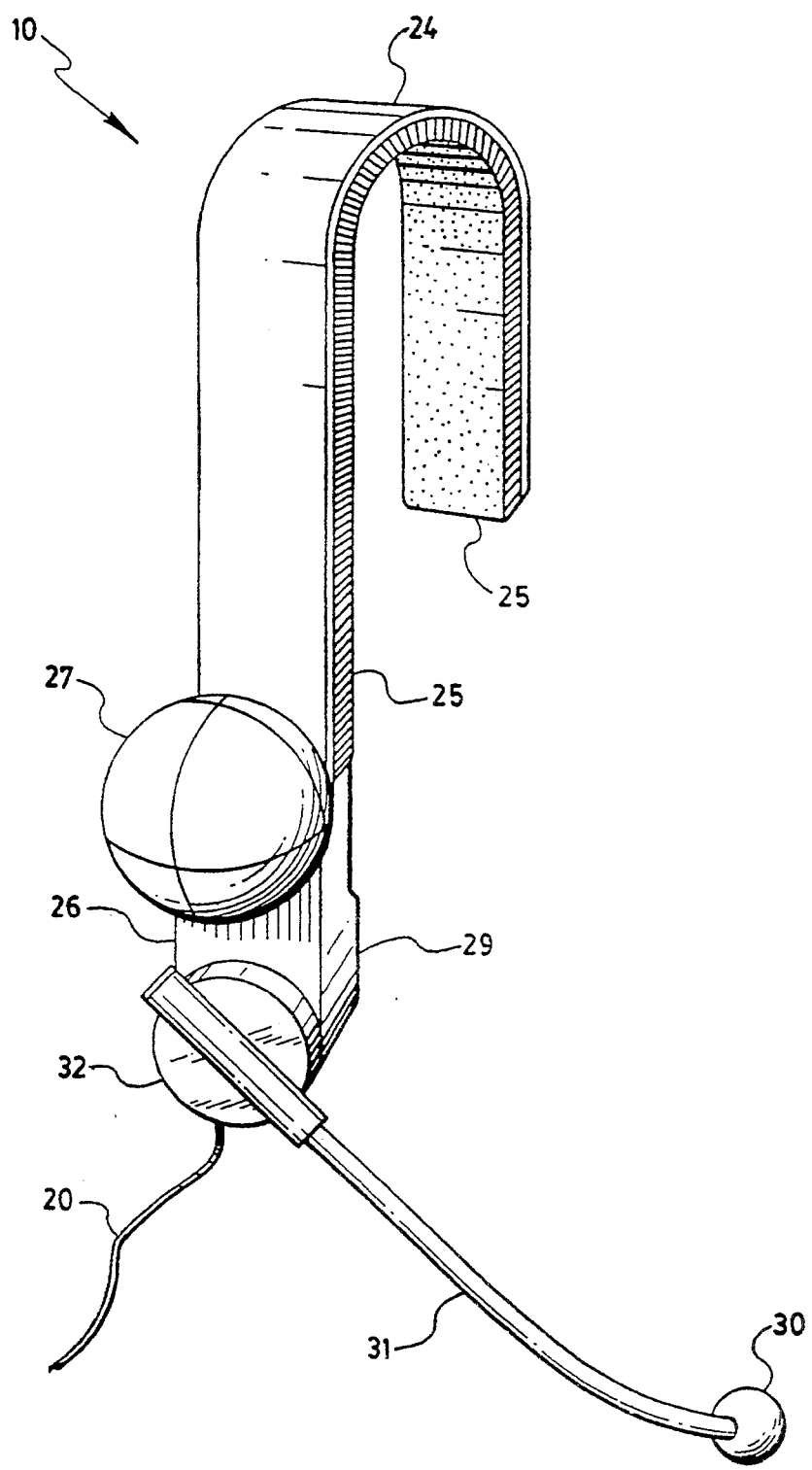
FIG. 2A is a perspective view of the orientation sensor input device of the present invention.
Figure 2B:
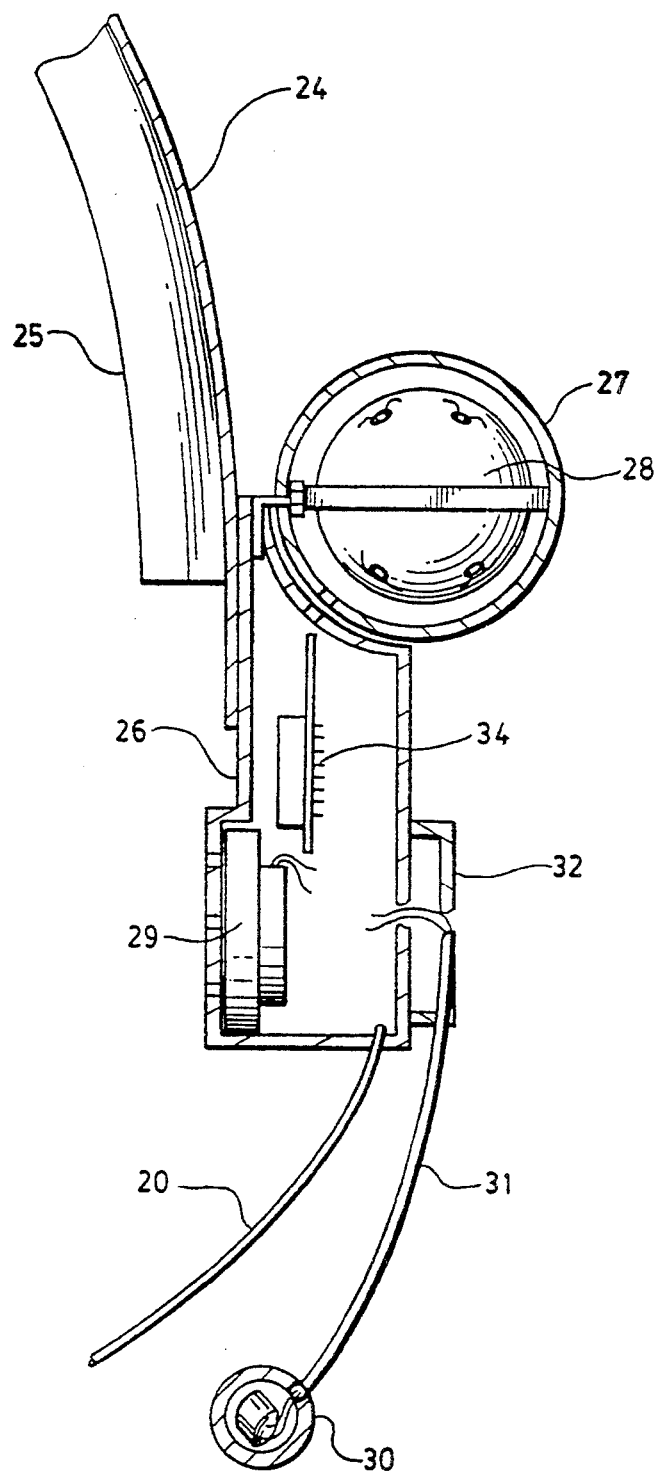
FIG. 2B is a diagrammatic illustration in partial cross section of the present invention, showing the location of the internal components.

Turning now to FIGS. 2A and 2B, the major components of the computer input device 10 are diagrammatically illustrated. The computer input device 10 includes a headband 24, preferably molded of durable plastic and having a shape and dimensions to fit comfortably around the head of the computer user. The headband 24 includes a soft foam insert 25 for supporting the headband 24 in a manner which is comfortable to the user. These considerations for user comfort are especially important when the anticipated user may be physically disabled, or for any other reason where the computer input device 10 would be worn for extended periods of time.

A circuitry housing 26 is fixedly mounted on an end portion of the headband 24. A generally spherical sensor housing 27, contains an orientation sensor 28. The sensor housing 27 mounts to the circuitry housing 26 with a screw/bushing arrangement, allowing the sensor housing 28 to be pivoted by means of finger pressure. The angle of the spherical housing 27 may thus be adjusted with respect to the headband 24. This allows the user to initially center the cursor on the display screen 18.

An earphone 29 is mounted in the circuitry housing 26 and positioned for operator comfort. As shown in FIG. 2B, the earphone 29 will not press against the user's ear during normal use, due to the locations of the foam insert 25 and the circuitry housing on the headband 26. The earphone 29 is used as an audio receiving device in certain computer applications including voice mail and audio messaging. In one application, the computer input device 10 provides a handicapped user with the ability to dial telephone numbers and conduct standard telephone communications through the computer 14, with the earphone 29 serving as the sound receiver.

A microphone 30 provides the user with a means for making audio commands, used to initiate conventional control functions, such as IRETURN or SELECT. The microphone 30 is a conventional miniature directional microphone mounted on a microphone support member 31 and a pivot member 32. By means of the pivot member 32, the microphone 30 is adjusted upwardly or downwardly for positioning in front of the user's mouth.

A printed circuit board 34 contains the electronic circuitry for the computer input device 10. More specifically, this includes a preamplifier for the microphone 30, analog circuitry for the operation of the orientation sensor 28 and digital circuitry for communication with the interface 12. Interconnection wiring between the printed circuit board 34, earphone 29, cable 20, orientation sensor 28, and microphone 30 are not shown in FIG. 2B for simplicity. The microphone 30 is also connected through the preamplifier to the earphone 29, providing voice feedback to the user, as in a conventional telephone handset.

The cable 20 exits the lower portion of the circuitry housing 26, so that it will cause minimum interference during operation of the computer input device 10. Although direct cabling is used in the preferred embodiment to keep the computer input device 10 inexpensive, it is within the scope of the present invention to link the computer input device 10 to the interface 12 by means of conventional miniature transmitter or transceiver technology.

The orientation sensor 28 is fixedly mounted within the sensor housing 27 as shown in FIG. 2B. The headset using orientation sensor 28 is the preferred form of input device for the present invention. The specific characteristics of the input device 10 are described in considerable detail in previously cited application Ser. No. 07/267,413.

In the preferred embodiment of the invention, the input device is allowed to control the cursor on the display screen 18 via the RS-232C output of the interface 12. Interface 12 receives the digitized signal from the input device 10 and adapts it to be received at the RS-232C input of the host computer 14. This allows selection mode software such as graphics programs to be fully controlled using the position sensor and the microphone input. However, an additional function of the interface 12 is to generate actual keyboard inputs to the host computer 14.

Using the input device to perform two-dimensional movement of the cursor on the display screen 18 is referred to as cursor control mode and is made to correspond to the head movements of a user wearing the headset 10. That is, tilting the head forward moves the cursor down and tilting it back moves the cursor up. Similarly, tilting the head to the right moves the cursor to the right and tilting the head to the left moves the cursor to the left. To allow a user to access the keyboard input function of the interface 12, a lower or upper limit is put on the cursor movement beyond which cursor control is disengaged. In the preferred embodiment, a lower limit is used and is taken as the digitized code from the input device which corresponds to the lowest possible cursor line on the display screen 18. This lower limit would therefore be exceeded by the user tilting the head forward beyond the angle necessary to locate the cursor at the bottom of the screen 18.

Once the lower limit of the cursor control mode is passed, the interface 12 enters a keyboard simulation mode. In this mode, the RS-232 output from the interface to the host computer is disabled. Inputs from the input device 10 are translated to digital codes recognizable to a standard keyboard controller as being key selections.

Since the number of different digitized outputs of the input device exceeds the number of possible keyboard key selections, more than one of the digitized outputs translates to the same keyboard key selection. Ranges of the x-y position coordinates represented by the digitized outputs of the input device are therefore alloted to each key representation. As the position of the orientation sensor changes enough to change the x-y coordinates from one designated range to another, the key selection code generated by the interface 12 changes to represent a different key input. Therefore, different keyboard key inputs may be designated by a user without the need for manual controls.

Figure 3:
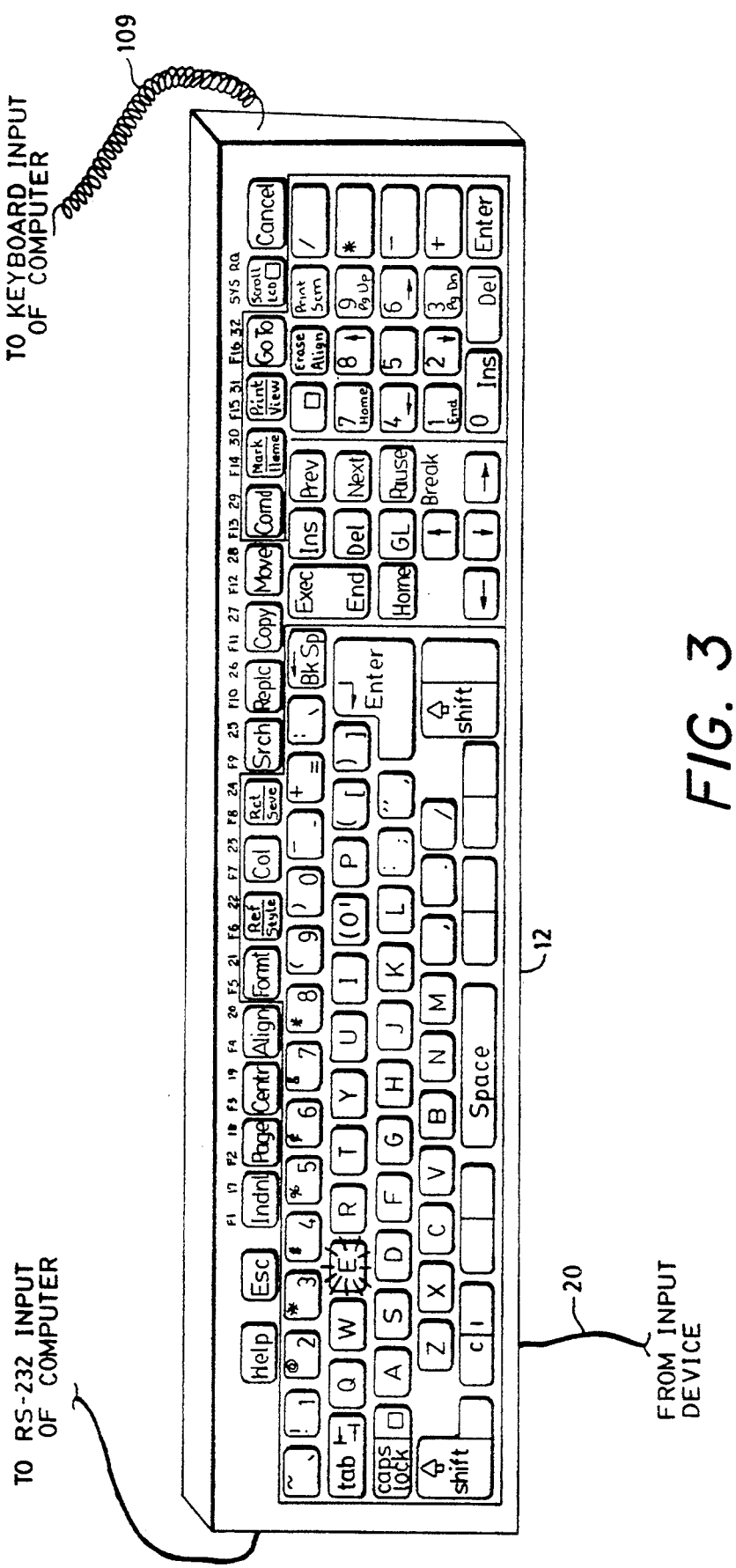
FIG. 3 is a perspective view of the interface unit of the present invention.

An enlarged perspective view of the interface 12 is shown in FIG. 3. The front surface of the interface is a key pad with an overlay which has an appearance of a keyboard which would ordinarily be used with the host computer 14. In the present embodiment, no manual keys are actually present on on the key pad. However, all the possible keyboard selections are represented in a pattern simulating the relative key arrangement of an actual keyboard, and in an alternative embodiment these may actually be mechanical keys responsive to touch. Furthermore, any alternative arrangement of keys may also be used with the present invention.

Underneath each key representation of the overlay of the present embodiment is an indicator which in the present embodiment is a light-emitting diode (LED) which is illuminated when selected by underlying interface circuitry. The portions of the overlay over each LED are sufficiently transparent to allow a user to visually identify when a particular LED has been illuminated. Printed on each transparent region is a symbol designating the key being represented. When a particular keyboard input has been selected with the input device, the LED which resides underneath the corresponding key symbol of the overlay is illuminated. A user therefore knows which of the possible key input codes is being generated by the interface electronics. Other types of indicators may be used (including audio indicators) as long as the necessary user feedback is provided.

The mapping of the input device signals to the particular key selection codes generated by the interface 12 is roughly arranged to correspond to the location of the LEDs of the interface. For example, if the LED under the symbol "T" were illuminated, a key selection input to the interface 12 would result in the generation of the keyboard input code for the symbol "T". If the orientation sensor was then tilted to the right far enough, the x-coordinate of the input device input would increase enough to shift the input into the next key selection range. Since the mapping of the ranges corresponds to the LED array, the next range to the right of the "T" range is the "Y" range. The movement would therefore cause the LED under the symbol "T" to be extinguished and the LED under the symbol "Y" to be illuminated. Correspondingly, a key selection input to the interface 12, while illuminating the "Y" diode, would result in the generation of the keyboard input code for the symbol "Y". In this manner, the successive illumination of LEDs in the array follows the movement of the input device and the generation of key codes.

As shown in FIG. 3, some of the keys of the keyboard overlay are of different sizes and shapes. The mapping of the positional inputs to the key codes is done so as to best correspond to the arrangement of keys on the overlay. Therefore, keys which are wider in the x-direction (such as the "space" key) have wider mapping ranges in the x-direction. Similarly, keys which are larger in the y-direction (such as the "shift" keys) have bigger mapping ranges in the y-direction. These mapping techniques help the successive lighting of the LEDs in the array to best mimick the movement of the input device.

It is often difficult for a user to keep the input device 10 completely still while moving to a particular LED. To prevent fluttering between two adjacent LEDs because of inadvertant head movement, a threshold value must be exeeded by the positional input to extinguish one LED and illuminate an adjacent one. Therefore, the positional input must not only change enough to designate the next range, but must exceed the crossover point between the ranges by the threshold value before the interface 12 switches to illuminate the new LED. Using the example above, if the LED under the symbol "T" were being illuminated, tilting the input device 10 far enough to the right would eventually cause the change to the LED under the symbol "Y". However, because of the threshold requirement, the positional input for the x-coordinate must increase to the lower x-value limit of the "Y" range and then increase further by the threshold amount before the switch to the "Y" LED is made.

The threshold value requirement is the same for each of the LED ranges for both the positive and negative x and y directions of movement. Thus, once the "Y" LED has been illuminated, a user desiring to return to the "T" LED must tilt the input device far enough left to decrease the x-coordinate until the lower limit of the "Y" range is exceeded by the threshold value. In the present embodiment, the threshold value is approximately equal to 1.5 times the length or width of one of the smaller alphanumeric keys. This threshold is the same for each key on the overlay regardless of the size of the key or its mapping range.

The following example demonstrating the threshold requirement assumes that the user starts with the LED under the character "T" being illuminated. In order to switch from the "T" LED to the "Y" LED, the user increases the x-coordinate of the positional input to go beyond the "Y" range and halfway across the "U" range (adjacent the "Y" range in the positive x-direction) before switching from "T" to "Y" occurs. Switching back to "T" then requires that the positive x-coordinate is decreased beyond "R" range (adjacent the "T" range in the negative x direction) and halfway into the "E" range (adjacent the "R" range in the negative x direction) before switching back to the "T" LED occurs. Since the threshold requirement affects movements in both the x and y directions, somewhat exaggerated head movements are required to switch between adjacent LEDs. This allows more defined user control, and eliminates the problem of LED flutter near the borders of the positional input ranges.

The key pad of interface 12 is positioned directly below the display screen 18, and the control in keyboard simulation mode is made contiguous with control in the cursor position mode. From cursor control mode, the user's head is tilted forward enough to bring the position signal below the predetermined lower limit. The cursor control mode is then disabled by the interface and the keyboard simulation mode is enabled. The lower limit of the cursor control mode must be exceeded by a threshold value before the user can enter keyboard simulation mode. This prevents the inadvertant switching between modes. The threshold value between the two modes is made large enough so a distinctly exaggerated downward head movement must be made before the keyboard simulation mode is entered.

Although the movement of the orientation sensor in the keyboard simulation mode allows the selection of different keyboard inputs, no key signal is actually transmitted to the host computer 14 until the user verifies the selection with a voice input to the voice control circuitry via microphone 30. The voice control circuitry recognizes two different sounds when in cursor position mode, but the sounds are not distinguished in keyboard simulation mode. Since all keyboard options are available=to the user in this mode, there is no need for recognizing different vocal inputs. However, the input voice signals must be of relatively short duration to be accepted by the voice control circuitry. This aspect reduces the incidence of inadvertant inputs from background noise, and is discussed in more detail with reference to FIGS. 6A and 6B. Once the LED over the desired key is illuminated, the user simply speaks an appropriate input sound into the microphone 30 and the key selection is transmitted to the host computer 14.

Figure 4:
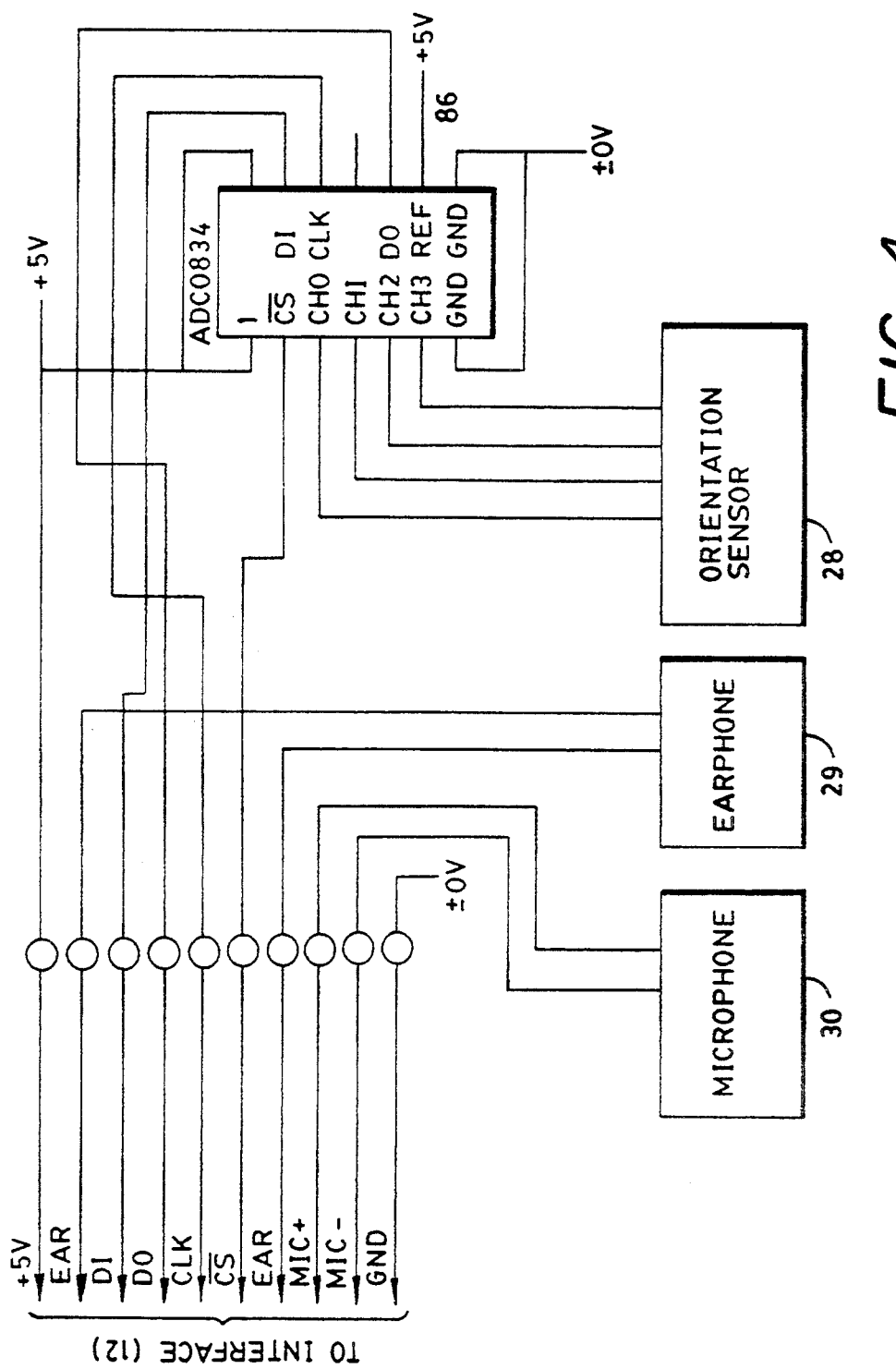
FIG. 4 is a schematic illustration of the analog-to-digital conversion of the signal from the orientation sensor of the present invention.

The electronics of the input device 10 are illustrated in part in FIG. 4. Orientation sensor 28 outputs two differential analog voltages representative of absolute x and y coordinate positions. The differential voltages are transmitted along four lines to analog-to-digital converter (ADC) 86. In the present embodiment, the ADC 86 is a Texas Instruments type ADC0834. The ADC 86 employs a data comparator structure to differentially compare the analog input signals. The digital output data has eight-bit resolution which indicates the resultant magnitude and sign of the orientation sensor signals. A clock signal (CLK) and a chip strobe are received from interface 12 for scanning data at the ADC 86. In addition, control signals are also sent to the ADC from the interface along the "data in" line, line DI, to designate which of the differential signals should be output and at which polarity. Data is output serially along the "data out" line, line DO, in response to commands received from the interface 12.

Both the earphone 29 and microphone=30 are also shown in FIG. 4 in block diagram form. Each requires two leads to communicate with the interface through the input device cable 20. The microphone 30 transmits vocal signals to voice control circuitry of the interface 12, while earphone 29 receives audio signals from the interface. A 5-volt power line and a ground (GND) line are also encased in the input device cable. In all, ten lines connect the input device 10 and the interface 12.

Figure 5:
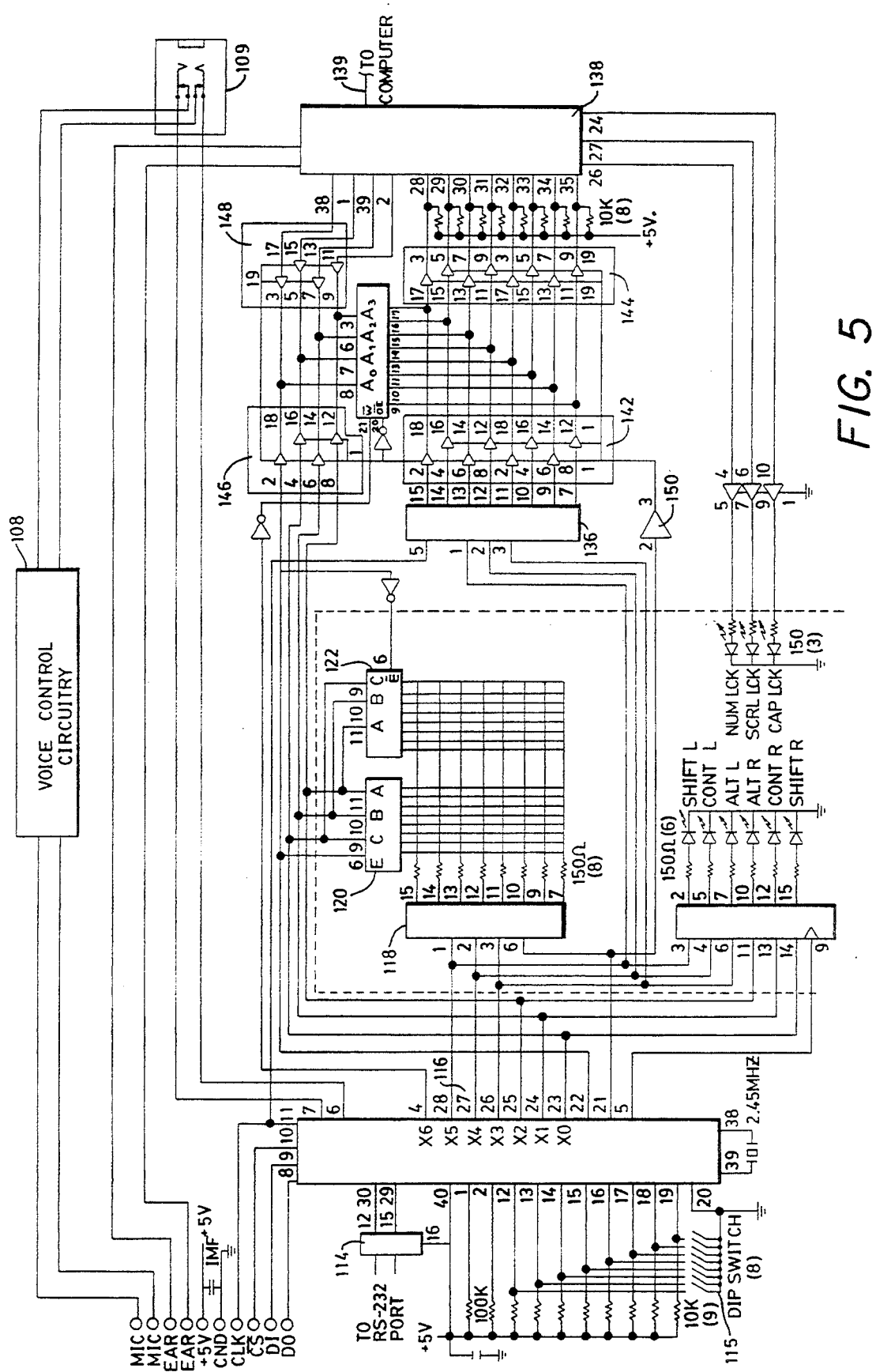
FIG. 5 is a schematic illustration of the interface electronics of the present invention.

The internal circuitry of the interface 12 is shown schematically in FIG. 5. The inputs from the input device 10 are shown arranged in a different order than shown in FIG. 4. It will be understood, however, that these arrangements have no physical significance, and serve illustrative purposes only. A ten-pin connector is provided at the end of cable 20 to allow the input device to be plugged into the interface 12. The two microphone connections are shown connected from the input device cable to voice control circuitry 108. The voice control circuitry receives audio signals input from the input device 10. This circuitry processes input voice signals from the user and provides an corresponding output to controller 110.

Figure 6A:
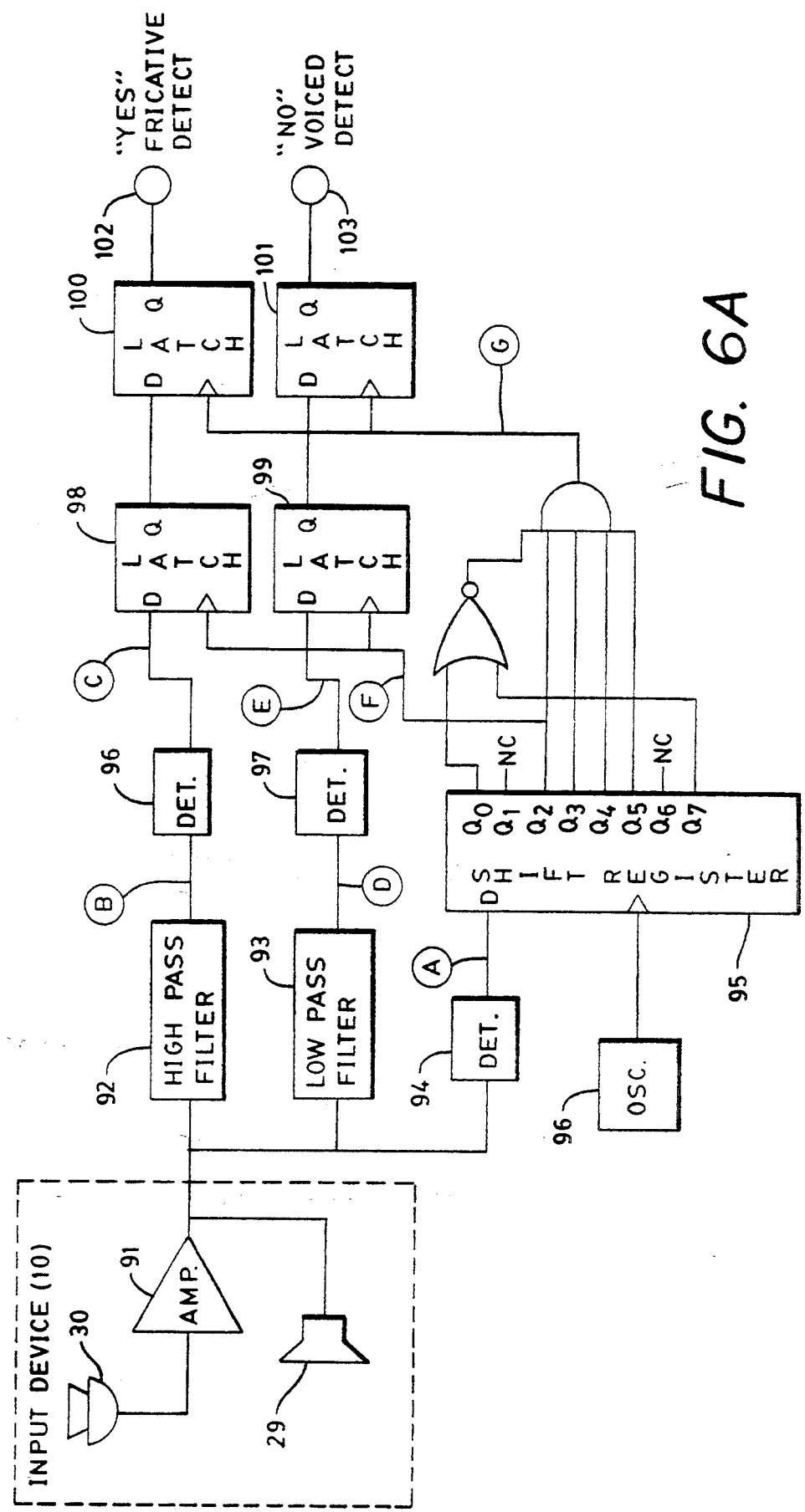
FIG. 6A is a block diagram of the voice control circuitry of the present invention.
Figure 6B:
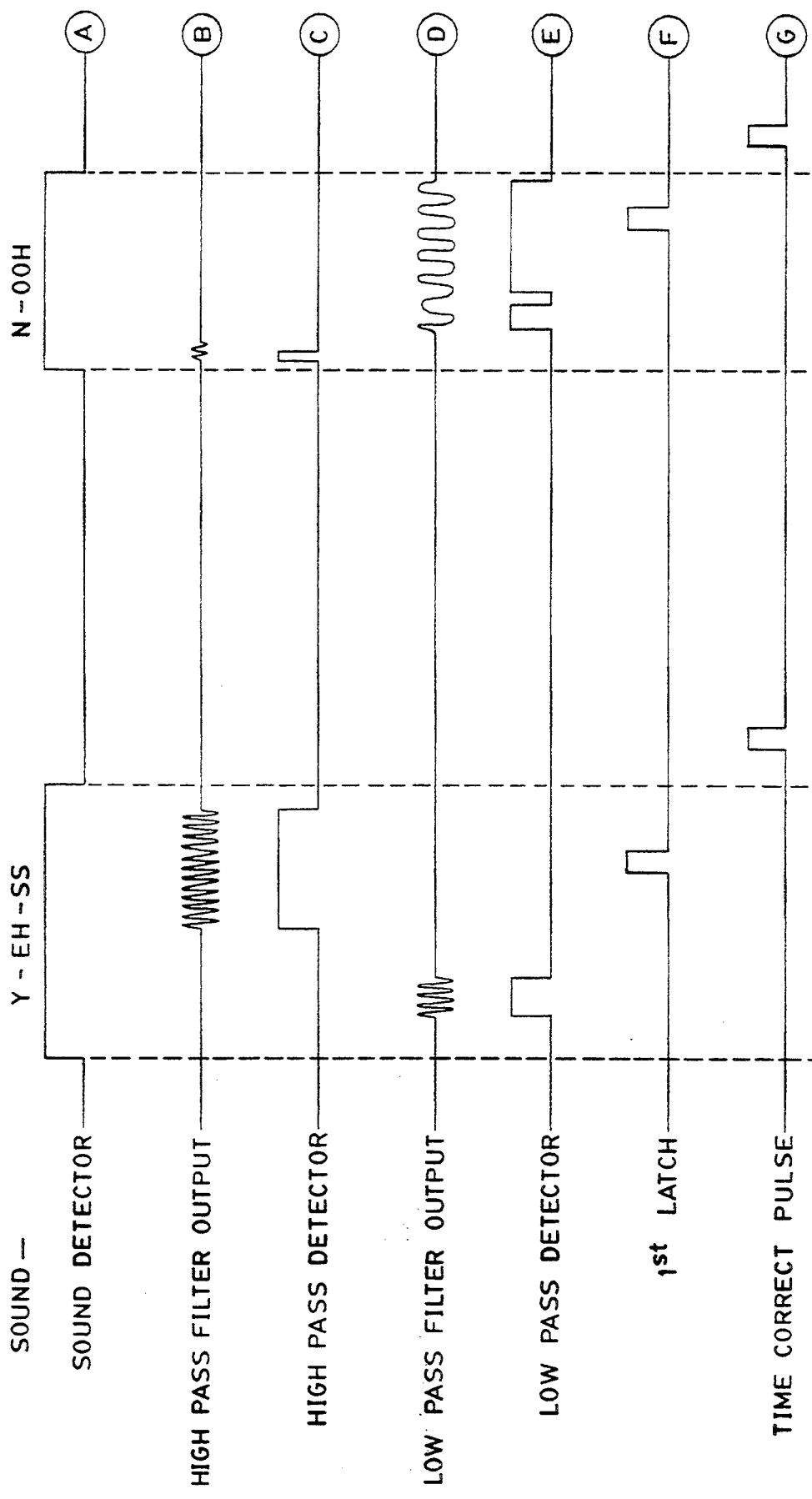
FIG. 6B illustrates the timing diagrams associated with the voice control circuitry of the present invention.

The voice control circuitry is shown in more detail in FIGS. 6A and 6B. FIG. 6A shows a block diagram of the voice control circuitry, and FIG. 6B shows the output waveforms and timing relationships associated with the outputs of the various blocks. The waveforms shown in FIG. 6B are each designated by a circled letter. These letters are also shown in FIG. 6A to identify the location of each waveform.

The voice control circuitry is basically a two-sound speech recognition device. The present invention makes use of the characteristic frequency ranges of certain phonetic sound types, rather than on specific words spoken in specific languages. The frequency range of voiced sounds (caused by vibration of the vocal cords) are generally lower than the frequency range of fricative sounds (caused by air moving through narrowed air passages in the mouth). Words such as "no" end in a voiced sound; most vowels are voiced sounds. Words such as "yes" end in a fricative sound ("sss").

Through microphone 30, the present speech recognition device detects short words that end in voiced or fricative sounds, such as "yes." and "no". To be detected, the sounds must be spoken in an isolated manner, rather than as part of continuous speech. In this way, conversation in the vicinity of the user will not cause commands to the control circuitry to be initiated.

The voice control circuit of the present invention is especially useful where the user speaks only a foreign language or possesses a speech difficulty or disability. In this case, the input device 10 may still be used effectively, as long as the user can make any voiced and fricative sounds. Furthermore, it is speaker independent and requires no training sessions with the user, as is required with some other speech recognition devices.

Microphone 30 receives the user's voice command, which is amplified by preamplifier 91, which also attenuates any frequency component below 100 hertz. The microphone 30 and accompanying preamplifier 91 are located within the input device 10. As shown in FIG. 6A, the output of preamplifier 91 is also presented to a high pass filter 92, a low pass filter 93, and a detector 94. The high pass filter 92 rejects all signal frequencies below 1500 hertz. The low pass filter 93 rejects all signal frequencies above 400 hertz. The detector 94 outputs a logic high whenever a sound signal is received by the microphone 30. The logic high signal from the detector 94 is clocked through an eight-bit shift register 95 by an oscillator 96, which operates in the 20 to 30 hertz range.

The output signals of the high pass filter 92 and the low pass filter 93 are presented to detectors 96, 97 which square up the signals. These outputs, in turn, are presented to latches 98, 99 which are clocked by the third bit of the shift register 95. By using the third bit instead of the first, the voice control circuitry disregards the first part (approximately 150 milliseconds) of the command word and determines whether the last part of the command word is a voiced or fricative sound.

Finally, the output of the shift register 95 is gated such that a logic high occurs if and only if the received sound has a duration of 250 to 400 milliseconds and is preceded and followed by a momentary pause in the audio signal. Any sound longer or shorter than the specified window size is ignored, along with those which are part of a continuous stream of sound, such as words embedded in sentences. When the command word has the correct parameters, it is clocked through a latch 100 if it ends in a fricative or through a second latch 101 if it ends in a voiced sound.

The "yes" and "no" inputs are used in cursor control mode as standard SELECT and RETURN function inputs. The "yes" and "no" signals of the voice control circuitry are input to controller 110 via external switch 109, shown in FIG. 5. Switch 109 is a plug port for plugging in the inputs of an alternative input device such as a joystick. If no plug is inserted in the switch outlet, the switch remains closed allowing the input of the signals from the voice control circuitry to the controller 110. However, when a plug from an alternative input device is inserted in the outlet, the plug breaks the contact between the voice control circuitry leads and the controller leads. The plug insertion at the same time creates a connection between the plug contacts and the controller leads. In this way, the yes/no inputs may alternatively be obtained from the select buttons of a joystick or other alternative input device.

Referring to FIG. 5, the lines CLK, CS, DI, and DO from the input device 10 are connected directly to controller 110 which, in the present embodiment, is a motorola microprocessor (No. MC68HC05CB). The controller is programmed to strobe the ADC 86 of the input device 10 along line CS. In response to the strobe signal, serial position data is transmitted from the ADC 86 to the controller 110 along line DO. The digitized position data is received by the controller 110 which stores the data in a temporary storage register. The timing of the transmission and reception of the serial position data is controlled by the clock signal transmitted from the controller 110 to the ADC along line CLK. This ensures that the ADC and the controller are synchronized to achieve accurate transmission of the serial position data. An oscillator 112 is connected to the controller 110 and provides the absolute timing signal from which the clock signal is derived.

A series of dual in-line package (DIP) switches 115 are shown connected to controller 1].0. These switches allow a user to change various parameters of the controller operation. In the present embodiment, these parameters include the speed of the cursor movement in cursor control mode, the polarity of the cursor movement, whether the interface is positioned above or below the display screen (i.e. whether an upper or lower limit is used), the baud rate of the serial communication through the RS-232 port, and the size of the threshold between key code mapping ranges. Another of the DIP switches of the present embodiment activates an automatic selection function in keyboard simulation mode. When this switch is on, a controller key code output which is not changed for more than 4 seconds is automatically selected. Therefore, if this switch is on, no selection inputs are are necessary to select keyboard inputs to the controller.

When the x-y position data is received by the controller 110, the y-coordinate is monitored to see if its value exeeds the lower limit of the cursor control mode by the required threshold value. If not, the position data is formatted to simulate the operation of a graphics input device and output to the host computer 14 from RS-232 output 114. However, once the lower y-coordinate threshold is exceeded, the RS-232 port is disabled.

When the y-coordinate of the position data decreases beyond the lower limit and threshold value recognized by the controller 110, the controller enters keyboard simulation mode. In this mode, the x-y coordinates of the input position data are used by the controller 110 as a look-up address to get keyboard key data. A different range of x-y coordinate inputs apply to each key code generated by the controller. Each key code is different and corresponds to a different key which would be found on a keyboard intended for use with the host computer 14. The threshold value requirement discussed previously with regard to switching in the LED array is actually a requirement for the generation of different key codes. The generation of a new key code requires the exaggerated movement of the input device to switch from one key code to the other. The LEDs respond directly to the key code output and therefore act as a representation of the key code which is being generated by the controller 110.

As shown in FIG. 5, the controller 110 has seven parallel data output lines (controller pin numbers 22–28) generally indicated at 116. The key code generated by the controller is a 7-bit representation output on these lines.

For convenience, the seven bits of the key code output by the controller 110 will be referred to as X0–X6, with X0 being the highest order bit and X6 being the lowest order bit. Receiving the 7-bit key code from the controller 110 are decoder/drivers 118, 120, 122. Decoder 118 is a three-to-eight line decoder which receives the three lowest order bits X4–X6 of the key code output by the controller 110. Decoders 120, 122 are also three-to-eight line decoders and work in parallel with one another, each receiving key code bits X1–X3. Bit X0 (from controller pin number 22) of the 7-bit key code is applied to the enable lines of the decoders 120, 122 to allow them to function jointly as a four-to-sixteen line decoder. Bit X0 is input directly to the enable input of decoder 120, but is inverted by inverter 126 before being input to the enable input of decoder 122. Thus when bit X0 is low, decoder 120 is enabled, and the disabled decoder 122 has an all zero output. Similarly, when X0 is high, decoder 120 is disabled and decoder 122 decodes the bits X1–X3.

The function of the three decoders 118, 120, 122 is to drive LED display 124. As is more clearly shown in FIG. 7, the grid wiring of the decoders and the LEDs of the array allows the lighting of each LED to indicate the output of a different 7-bit key code from the controller 110. In this manner the key code being generated by the controller is identified by a system user. As shown in the enlarged view 128 of an individual LED wiring arrangement, the presence of a sufficiently positive voltage on one of the output lines of decoders 120, 122 results in the lighting of a particular LED along that line if the crossing line for that LED from decoder 118 is at a low voltage. Thus, a decoded output code is used to set up a voltage across one of the LEDs in the array such that the LED is illuminated. The illuminated LED is that which is coupled between a row selected by decoder 118 and a column selected by decoders 120 and 122.

Figure 7:
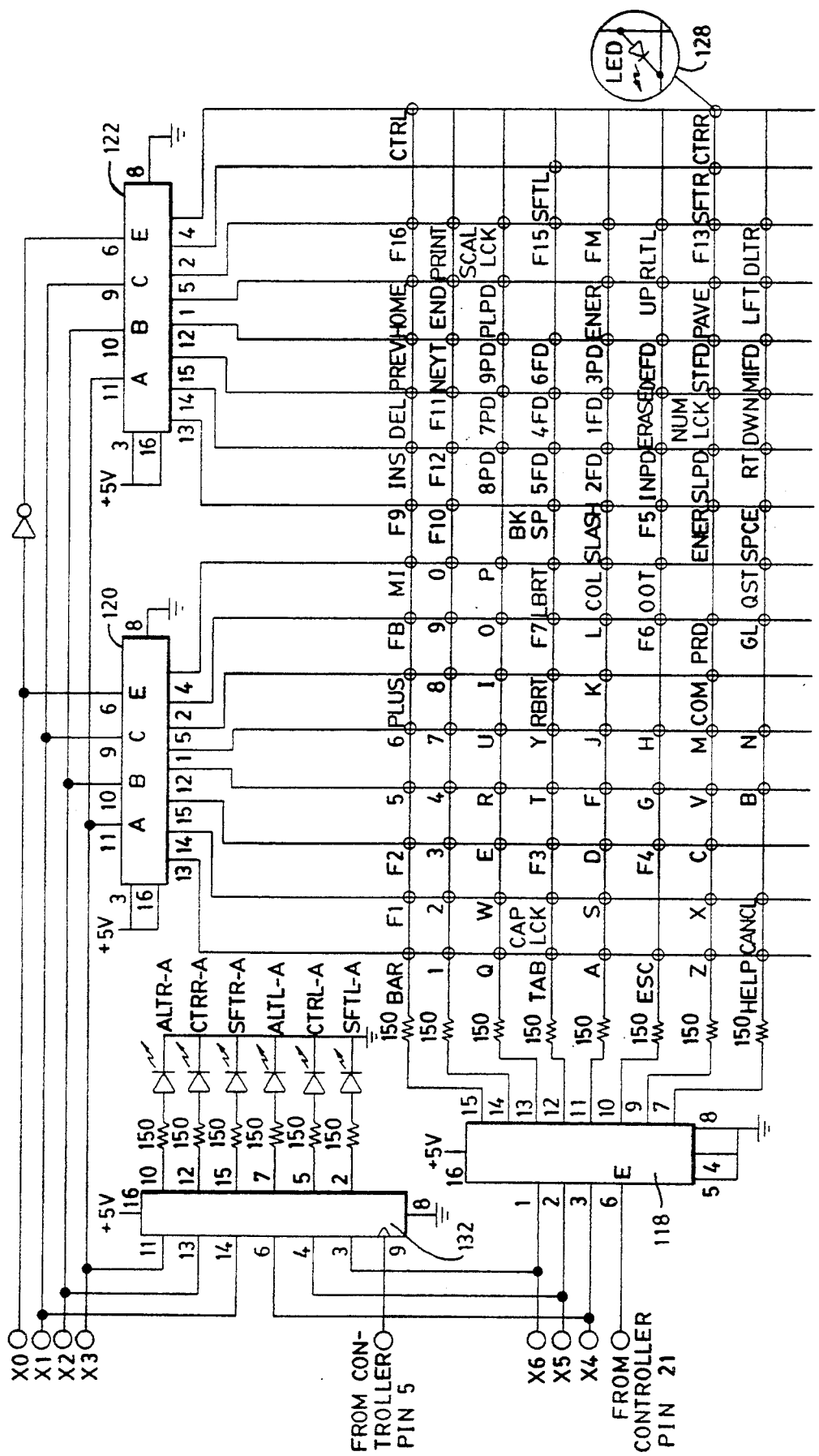
FIG. 7 is a schematic illustration of the LED array of the present invention.

The LED array shown schematically in FIG. 7 corresponds to the LEDs under the keyboard overlay of the interface 12 shown in FIG. 3. The LEDs are arranged underneath the overlay which looks like a keyboard but has indicators rather than keys. When a key code generated by the controller 110 reaches the decoders, the LED positioned under the key on the overlay which corresponds to that key code is illuminated. The switching from one LED to another is directly controlled by the changing key codes output by the controller 110. Therefore, the LED illuminated always indicates the key which is represented by the key code being generated by the controller 110.

Each key represented on the key pad overlay has an LED of the array 124 which illuminates it from underneath. In the present embodiment these LEDs are red. However, in addition to the red LEDs, some of the keys of the overlay also have a green LED which is controlled separately from the keys of array 24. Some of the keys having a red and a green LED are the so-called "function keys" which are used for selecting alternative inputs of the "character keys". In the present embodiment, these keys include two "shift" keys, two "control" keys, and two "alternate" keys. The green LEDs for the function keys are shown being controlled by latch 132 in FIG. 5 and FIG. 7. Although these schematic figures show the green LEDs in a different location than the red LEDs, each green LED is actually positioned adjacent a red LED under the appropriate function key shown on the overlay. The overlay of FIG. 3 shows each function key having a line separating in into two sides. This is to indicate that two LEDs reside under these keys one to either side of the line. These lines do not necessarily exist on the actual keyboard overlay.

To implement function keys on a manual keyboard, a user would depress and hold a function key while then striking a character key. A method of "holding" a function key is therefore provided with the present invention. Latch 132 powers a green LED to identify that the function key designated by that LED is being "held down" pending the selection of a character key. The specifics of the function key control will become clear in the description which follows.

Referring back to FIG. 5, the correct delivery of a desired key code to the keyboard input of the computer 14 is by means of a random access memory (RAM) 130 used in conjunction with keyboard controller 138 and a decoder 136. The keyboard controller 138 is the same controller that is used with a manual keyboard compatible with the computer 14. In the present embodiment, the keyboard controller is model number 70C42 made by Intel Corporation. The keyboard controller 138 scans RAM addresses as if it were scanning a manual keyboard array. Therefore, from the perspective of the keyboard controller, the key code generation circuitry of the interface 12 appears as a manual keyboard. However, what is actually being scanned is the RAM 130 in which the generated key codes are temporarily stored.

While in keyboard simulation mode, changes in orientation of the headset input device 10 cause the key codes generated by the controller 110 to change as well. These changes are continuously monitored by the user through observation of the LED array 124 which identifies the key codes being generated. While the three least significant bits of the key code are input to decoder 118 of the LED array, they are simultaneously input to three-to-eight line decoder 136. The decoder 136 decodes the three bits for input to RAM 130. The four most significant bits of the key code, X0–X3, are then used to select a 4-bit address in RAM 130 at which the output of decoder 136 is stored. Once a code is stored in memory 130, the code can be scanned by keyboard controller 138 which identifies it as a key selection.

Keyboard controller 138 continuously scans RAM 130 for keyboard inputs by sequencing through all possible 4-bit addresses. Each different address is taken to be a different "column" of the simulated keyboard grid. At each address is an eight-bit data code which simulates the eight "rows" of the simulated keyboard grid. The keyboard controller 138 has eight input lines which read the 8-bit code for each address. When one of the bits is non-zero, the keyboard controller regards the non-zero element as indicating a key press. The key is identified by coordinating the "column" represented by the current address with the row designated by the particular non-zero bit. Once the key is identified, the controller generates a keyboard input which is output to the host computer 14 on keyboard input cable 139.

To allow the selection of particular key codes by a user, buffers 142, 144, 146, 148 are provided which work in conjunction with buffer 150. Buffers 142, 146 are normally disabled, and isolate RAM 130 from the output decoder 136 and the address bits X0–X3 of the key code. Buffers 144, 148 are normally enabled, and control the transmission of information between RAM 130 and the keyboard controller 138. Thus, while a user is not selecting a key, but is changing the key code by moving the input device, buffers 142, 146 are disabled and prevent the input of information to RAM 130. However, during this time buffers 144, 148 are enabled, allowing addresses to be transmitted from the keyboard controller to the RAM, and RAM outputs to reach the keyboard controller.

When the user wishes to select a key code identified by the LED display, a "yes" or "no" command is given by speaking into the microphone 30. If a different input device is being used, similar inputs are provided at switch 109. The inputs are provided to the controller 110 which responds by generating several different output signals.

First, the clock pulse on line CLK of the controller is suspended, and the CLK line is temporarily held high. Since the CLK line delivers a signal to the enable input of decoder 136, this keeps the decoder temporarily enabled (when disabled, the decoder 136 output is all zeros). In addition, an output to the write input of the RAM is provided (from controller pin number 4) to allow writing into the memory from the decoder.

Finally, the output from pin 21 of the controller to the buffer 150 is temporarily driven low. When the signal goes low, the status of buffers 142, 146 and 144, 148 is reversed, buffers 142, 146 being enabled and buffers 144, 148 being disabled. The signal from the controller 110 to the buffers is also input through an inverter to the data enable (DE) input of the RAM 130. The voltage at this input is ordinarily low to allow the output of data along the data lines in response to the sequencing of input addresses from the keyboard controller 138. However, the pulse on the buffer line from the controller disables the data out function, allowing the writing in of the decoder 136 output.

When buffers 144, 148 are disabled, the keyboard controller 138 can no longer access the RAM memory 130. The data inputs of the keyboard controller 138 are held high during this period by resistors 152 which are fed by a 5-volt power supply. The enabling of buffers 142, 146 allows the key code currently displayed by the LED display to be input to RAM 130. The bits X0–X3 of the keycode are input to the RAM address ports to designate a particular 4-bit address. Meanwhile, bits X4–X6 of the key code are decoded by decoder 136 and output to the data ports of RAM 130. The logic low signal from the controller 110 to the write enable input of the RAM 130 allows the writing of the decoder 136 output into the RAM 130. The eight bit data is thereby stored in the RAM memory at the address designated by the 4-bit address of bits X0–X3.

The low pulse to the buffer 150 is made long enough to allow the correct storage of the key code information. Once the polarity becomes high again, the buffers 142, 144, 146, 148 return to their normal status. However, now when the keyboard resumes its scan of the RAM memory, the data of the new key code is read from the designated RAM address. The keyboard controller identifies the appropriate key and transmits a keyboard input to the host computer 14. The keyboard controller 138 also sends an audio confirmation signal (a "beep") to the user through earphones 29. Since the output from the controller 110 to buffer 150 is also input to the enable input of decoder 118, the generated low pulse to buffer 150 results in the temporary disabling of the LED display by bringing the "enable" input of decoder 118 low. This causes any LEDs currently lit to go out, thus providing a second means of confirmation to the user (who is observing the display) that the key code was input to the keyboard controller 138.

Once the code stored in the RAM 130 has been read by the keyboard controller 138, the RAM memory must be cleared to prepare for receipt of the next key code. The controller 110 delays for a time great enough to ensure that the keyboard controller has read the key code out of memory, and then initiates a clearing of the memory 130. To clear the RAM, the controller once again activates the write enable input of the RAM, and discharges a low pulse to the buffer 150. However, for the clearing cycle, the decoder 136 is not enabled by a signal on the CLK line of the controller 110. With the decoder 136 disabled, the output on the data line of the decoder is all logic zeros. With the buffers 142, 146 enabled, the controller sequences through all the possible addresses on bits X0–X3. Since the RAM is responding to these address inputs, the all-zero data output of the decoder 136 is read into each of the 16 RAM addresses. Thus the RAM memory 130 is cleared, and after all the 4-bit addresses have been output by the controller 110, the signals controlling the buffer 150 and the write enable of the RAM are returned to their normal state.

A particular facet of the present invention is its ability to "hold down" the function keys "shift" "alternate" and "control". Since on a manual keyboard these keys would be held down while another key was pressed, the keyboard controller must identify both key codes simultaneously to generate the proper keyboard input. When a function key is selected with the system of FIG. 5, the key code information is input to RAM 130 and stored as an ordinary key press. Ordinarily, the memory is cleared after the key code is input to the keyboard controller. However, when an input to the controller is identified as selecting the key code of a function key, the ensuing controller operation is slightly different than that for a character key.

The storing of the function key code to RAM memory 130 is performed in the same manner as a character key. However, following the function key code storage, the controller outputs a signal to the enable input of latch 132, allowing it to latch a bit corresponding to the chosen function key, which is output by the controller one of bit lines X1–X6. When the function key code is latched, the output of the latch 132 powers one of the green LEDs to identify the function key that has been selected and held. The controller 110 then sets the appropriate one of six flags internal to the controller, each of which corresponds to one of the six function keys. The controller does not initiate a memory clear function after the function key has been identified by the keyboard controller. Therefore, the key code remains stored in RAM memory 130 until the selection of another key.

When a second key is selected, the usual storage procedure is implemented with the function key representation remaining in the RAM 130. The second key code is thereby stored in the RAM 130 along with the function key code. When the keyboard controller scans the RAM 130, it identifies both sequentially selected keys as being selected simultaneously. Thus the function key is seen by the keyboard controller 138 as being "held down". Once both keys are identified by the keyboard controller 138, the memory 130, latch 132, and internal flags of the controller are all cleared.

To assure the simultaneous presence of function key and character key codes in the RAM 130, the key codes of the function keys must contain 4-bit addresses which are not shared by any keys which are used with function keys. Otherwise, the selected character key code would overwrite the function key code in the selected memory address. Referring back to FIG. 7, each column of the LED grid corresponds to a different 4-bit address contained in bits X0–X3 of the key code. As shown, the two "control" keys ("CTRL" and "CTRR") and the two "shift" keys ("SFTL" and "SFTR") are alone in their own columns. Therefore, no other keys share the same 4-bit address with either the "control" or the "shift" keys. The "alternate" keys ("ALTL" and "ALTR") share a different column only with keys which are not used with the "alternate" function keys. Therefore, no simultaneous address problems occur.

It will be noted with reference to FIG. 7 that "control" "shift" and "alternate" function key codes are at different addresses from each other to allow the use of two function keys at the same time. In such a case, a first function key representation is stored at a first address of RAM 130 while the corresponding green LED is latched and a first controller flag is set. The RAM 130 remains uncleared while a second function key is selected and its code representation is input to a different address of the RAM 130. A second green LED is now latched and a second flag is set within controller 110. Meanwhile, RAM memory 130 still remains uncleared. When a character key is finally selected, the character key is input to a third 4-bit address of the RAM and the keyboard controller reads the three key representations stored in the RAM 130. Following the identification of a character key by the keyboard controller 138, the RAM 130, latch 132 and internal flags of the controller 110 are cleared.

If a user has selected a function key, and then decides not to use that key, the key may be toggled off by selecting that key a second time. The controller identifies the function key as being held by the internal flag set when the key was selected. If a function key is selected when a flag indicates that the function is already being held, the latch 132 and the internal flag are cleared, and the controller initiates a memory clear function to remove the key representation from the RAM memory 130. The controller 110 individually identifies the six different function key flags, and allows a function key to be cleared with either of the keys performing that function. Therefore, if the left "shift" key was originally selected, selection of the right "shift" key while the shift is held results in the same clearing function as if the left "shift" had been selected a second time.

In the preferred embodiment, this function key memory clear function does not include the sequencing of addresses as performed in the normal clear function. Instead, the controller just provides the address of the undesired function key to the RAM address inputs. In this way, any other function keys codes which are being held in memory are retained. Similarly, all the outputs of latch 132 and internal flags of the controller 110 are not cleared, but only the one corresponding to the undesired function key selection.

Other toggle keys which normally exist on a manual keyboard are also used with the present invention. However, the toggling of these keys is controlled by the standard keyboard controller 138. The toggle keys include the "numlock", "scrlock" and "caplock" keys. Since the toggling of these keys is handled by the keyboard controller 138, the key codes are input as if they were for standard character keys. Green LEDs are provided for these keys in addition to the red LEDs which designated them in the LED array. The control of the green LEDs is provided by outputs from the keyboard controller 138. Similar to the function keys, the representations of the toggle keys in the overlay of FIG. 3 show them divided down the middle to designate that two LEDs are associated with that key. These lines do not necessarily exist in the actual keyboard overlay.

Figure 8A:
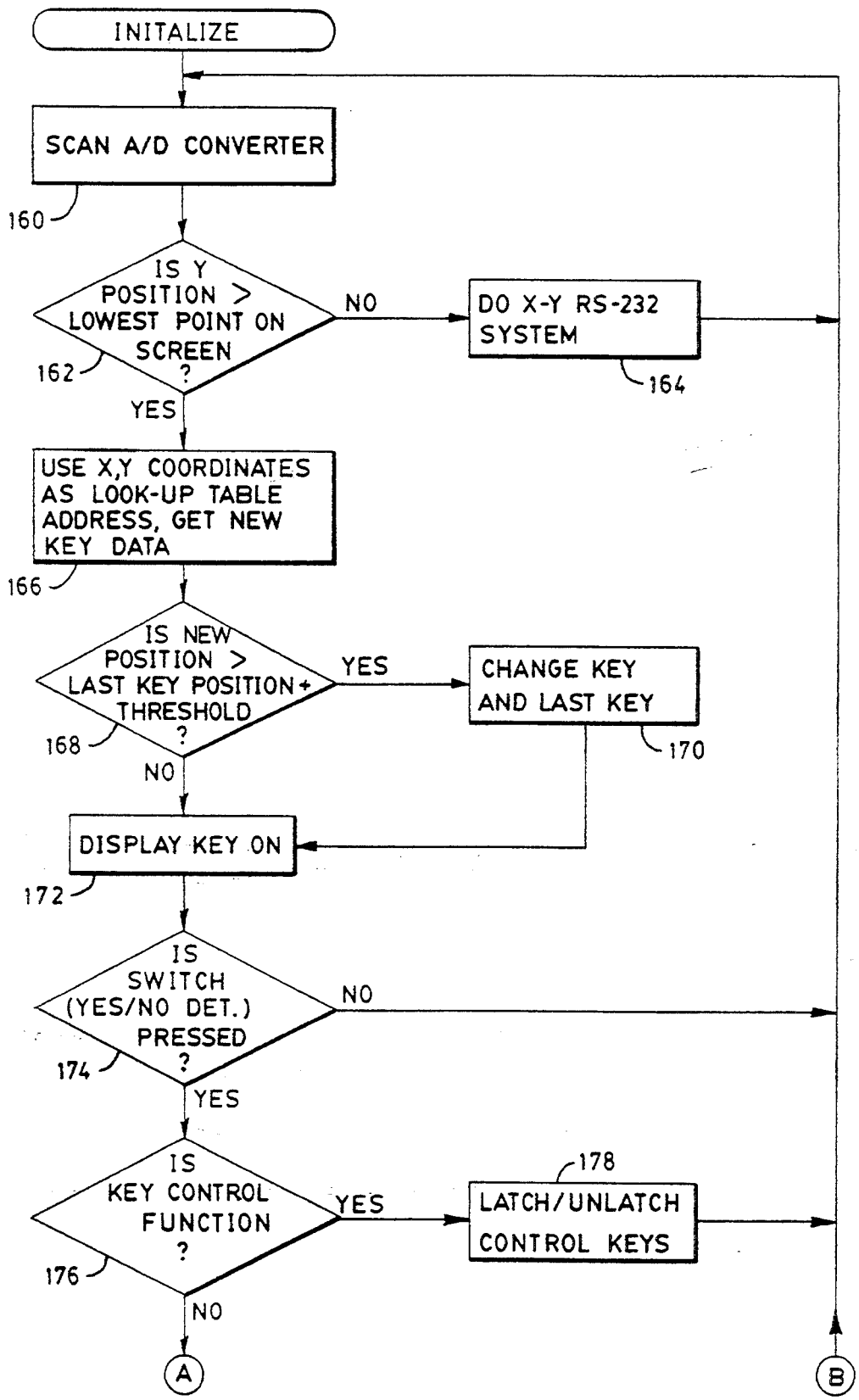
FIGS. 8A and 8B show a flow chart describing one aspect of the present invention.
Figure 8B:
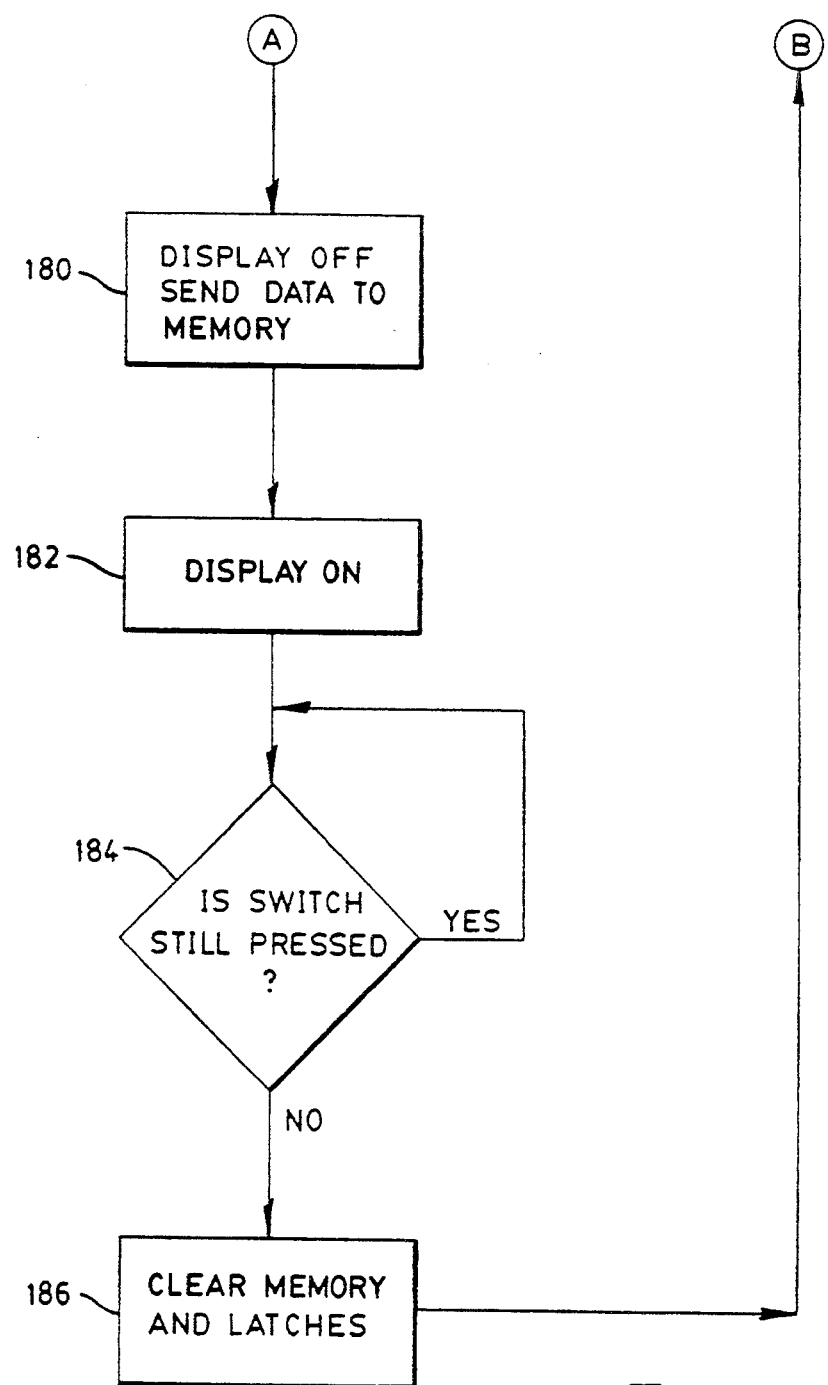

Making reference to the flow chart of FIGS. 8A and 8B, an overview is provided of the operation of the computer system in keyboard simulation mode. The system runs through an initialization routine when turned on. The controller 110 then begins scanning the ADC 86 of the input device 10 at block 160. If the y-coordinate input from the ADC 86 is not detected as being less than the lower limit of the cursor control mode plus the threshold value at block 162, the RS-232 functions of the system are performed at block 164. If the y-coordinate is low enough, however, the system is placed in keyboard simulation mode and goes to block 166.

As shown in block 166, the x-y coordinates of the input device positional input are used as a look-up table address, and a key code is formed. Input changes are checked in block 168. If the input has changed sufficiently to overcome the threshold value and designate a new key range, the key code is changed in block 170. As shown at 172, the key code generated by the controller is displayed at the key pad LED display. While the display is on, the controller monitors for any "yes"/'-'no" (or alternative) inputs from the user, as shown in block 174. Both "yes" and "no" perform the same selection function in keyboard simulation mode. If no selection has been made, the system continues to monitor for inputs and display any new keys.

When a user input is detected, the controller checks to see if the key code is designating a function key (block 176). If the designated key is a function key, the controller checks its internal flags to see if the function is already selected (block 178). If the function has not been selected, the appropriate flag is set, a corresponding green LED is latched and the the data is input to memory 130. If the flags indicate that the function designated by the function key is already selected, the output green LED is unlatched, the flag which was set for that function is cleared, and the address in memory 130 containing the undesired function key representation is cleared. These functions are combined in the block 178 of the flow chart of FIG. 8A. Once the latching or unlatching of the function key is complete, the controller 110 waits for the next input.

If the key selected at block 176 of the flow chart is not a function key, the input procedure continues as shown in FIG. 8B. At block 180, the display is turned off while the key representation is stored in RAM 130. The display is then turned back on, and the keyboard controller is allowed to scan the memory 130 (block 182). The selection inputs using the orientation sensor 10 are timed pulses, but if a joystick or other input device with buttons or other physical switches is used, monitoring of the switch depression is required. Block 184 shows a holding loop which waits until the input switch is released before proceeding. This prevents multiple inputs from the holding of a selection input switch. Finally, once the key input is received by the keyboard controller, the memory 130 and all latches and flags are cleared (block 186).

While the invention has been particularly shown and described with reference to a preferred embodiment thereof, it will be understood by those skilled in the art that various changes in form and details may be made therein without departing from the spirit and scope of the invention as defined by the appended claims. In one alternative embodiment, the key pad of FIG. 3 has manual keys in which the LED indicators reside. In that embodiment, either the input device 10 or the manual keys of the key pad may be used to select desired keyboard inputs.

In other embodiments, different forms of indicators are used to identify the key code to the user. These indicators might include an LCD display or a separate monitor. The display might have separate indicators, or might be part of a device which displays represented key characters. Other possibilities include the use of an audio indicator. In general, as long as the indicator presents a representation to a user of the key code generated by the controller, it can be implemented in the present invention.

I claim:

1. A computer system comprising a processor, a display screen and a keyboard input port adapted to receive inputs from a mechanical keyboard, the system further comprising:
   an input device for providing a cartesian positional input;
   a keypad having indicators for indicating individual keys;
   a controller responsive to the input device for indicating individual keys on the keypad and further responsive to a key select input to select an indicated key and to store a key representation of the selected key, the key representation including a single active data bit within a word indicating a selected key position within a key matrix;
   a memory circuit responsive to the controller to store the representation of the selected key, said memory circuit having an addressable memory space which simulates a mechanical keyboard; and
   a keyboard controller adapted to scan columns of mechanical key contacts and sense the state of the contacts, said keyboard controller scanning the contents of the memory circuit as it would scan columns of mechanical key contacts, sensing the representation of the selected key, and providing an input representative of the selected key to the keyboard input port.

2. A computer system according to claim 1 wherein key representations stored by the memory circuit identify the input to be provided by the keyboard controller to the keyboard input port.

3. A computer system according to claim 1 wherein the memory circuit is periodically scanned by the keyboard controller to read any new key representations stored in the memory unit.

4. A computer system according to claim 1 further comprising buffer circuits for regulating the transfer of key representations to and from the memory circuit.

5. A computer system according to claim 4 wherein the buffer circuits respond to an input from a user of the computer system to allow the memory circuit to store a particular key representation to be read by the keyboard controller.

6. A computer system according to claim 5 wherein said input from a user results in the storage of a key representation in the memory circuit which represents the key identified on the keypad indicators, the reading of the stored key representation by the keyboard controller causing the keyboard controller to input a keyboard input to the keyboard input port which designates the identified key.

7. A computer system according to claim 6 wherein said memory circuit is cleared after a key representation representing a character key is read from the memory circuit by the keyboard controller.

8. A computer system according to claim 1 wherein the indicators comprise function indicators for indicating storage by the memory circuit of key representations representing function keys.

9. A computer system according to claim 1 wherein the indicators are LEDs of an LED array.

10. A computer system according to claim 1 further comprising a keyboard representation on the keypad, the keys of which are associated with the indicators.

11. A computer system according to claim 1 wherein the indicators are a matrix of light emitting elements corresponding to a mechanical keyboard contact matrix.

12. A computer system according to claim 1 wherein the controller comprises a microprocessor.

13. A computer system according to claim 1 wherein the key select input is a voice input.

14. A computer system according to claim 1 wherein the input device comprises an orientation sensor adapted to be worn as a headset, the orientation sensor modifying the positional input in response to changes in spatial orientation of the sensor.

15. A computer system according to claim 1 further comprising a cursor control interface for providing the cartesian positional input to the processor for controlling the position of a cursor on the display screen in a cursor control mode of the system.

16. A computer system according to claim 15 wherein the cartesian positional input controls implementation of the cursor control mode.

17. A method of providing a keyboard input to computer system comprising a processor, a display screen and a keyboard input port adapted to receive inputs from a mechanical keyboard, the method comprising:
   providing a cartesian positional input to the system with an input device;
   receiving the positional input from the input device with a controller which generates a key representation of an indicated keyboard key, the key representation including a single active data bit within a word indicating a selected key position within a key matrix;
   providing a visual indication of the indicated keyboard key on a keypad having indicators for indicating individual keys;
   in response to a key select input from a user, selecting the indicated key and storing the key representation of the selected key in a memory circuit, the memory circuit having an addressable memory space which simulates a mechanical keyboard;
   scanning contents of the memory circuit with a keyboard controller to sense the stored representation of the selected key, the keyboard controller being adapted to scan columns of mechanical key contacts; and
   providing an input representative of the selected key to the keyboard input port.

18. A method according to claim 17 wherein the indicators are LEDs of an LED array.

19. A method according to claim 17 wherein the indicators are associated with a keyboard representation on the keypad.

20. A method according to claim 17 wherein the indicators are a matrix of light emitting elements corresponding to a mechanical keyboard contact matrix.

21. A method according to claim 17 further comprising indicating storage by the memory circuit of key representations representing function keys.

22. A method according to claim 17 wherein the key select input is a voice input.

23. A method according to claim 17 wherein the input device comprises an orientation sensor adapted to be worn as a headset, the orientation sensor modifying the positional input in response to changes in spatial orientation of the sensor.

24. A method according to claim 17 further comprising providing the cartesian positional input to the processor to control the position of a cursor on the display screen in a cursor control mode of the system.

25. A method according to claim 24 wherein the cartesian positional input controls implementation of the cursor control mode.

26. A computer system comprising a processor, a display screen and a keyboard input port adapted to receive inputs from a mechanical keyboard, the system further comprising:
an input device for providing a cartesian positional input;
a keypad having indicators for indicating individual keys;
a controller responsive to the input device in a keyboard simulation mode of the system for indicating individual keys on the keypad and for providing an input to the keyboard input port, said controller being further responsive to a key select input to store a representation of a selected indicated key;
a cursor control interface for providing the cartesian positional input to the processor for controlling the position of a cursor on the display screen in a cursor control mode of the system; and
a mode controller for:
monitoring the cartesian positional input,
implementing the keyboard simulation mode when the cartesian positional input indicates a position beyond a position limit, and
implementing the cursor control mode when the cartesian positional input indicates a position within the position limit.

27. A computer system according to claim 26 further comprising:
a memory circuit responsive to the controller for storing the representation of the selected key, said memory circuit having an addressable memory space which simulates a mechanical keyboard; and
a keyboard controller adapted to scan columns of mechanical key contacts and sense the state of the contacts, said keyboard controller scanning the contents of the memory circuit as it would scan columns of mechanical key contacts, sensing the representation of the selected key, and providing an input representative of the selected key to the keyboard input port.

28. The computer system of claim 26 wherein the position limit corresponds to a value on a cartesian coordinate axis.

29. The computer system of claim 28 wherein the mode controller switches between the cursor control mode and the keyboard simulation mode as a value in the cartesian positional input crosses the value corresponding to the position limit.

30. The computer system of claim 29 wherein:
the input device is adapted to be worn as a headset by the user; and
the cartesian positional input is controllable by a position of the user's head.

31. The computer system of claim 26 wherein:
the input device is adapted to be worn as a headset by the user; and
the cartesian positional input is controllable by a position of the user's head.

32. The method of claim 28 further comprising:
adapting the input device to be worn as a headset by the user; and
controlling the cartesian positional input by changing a position of the user's head.

33. A method of providing input to a computer system comprising a processor, a display screen and a keyboard input port adapted to receive inputs from a mechanical keyboard, the method comprising:
providing a cartesian positional input to the system with an input device;
monitoring the cartesian positional input relative to a position limit;
when the cartesian positional input indicates a position beyond a position limit, implementing a keyboard simulation mode comprising:
receiving the cartesian positional input from the input device with a controller which generates a key representation of an indicated keyboard key;
providing a visual indication of the indicated keyboard key on a keypad having indicators for indicating individual keys; and
providing an input representative of a selected key to the keyboard input port; and
when the cartesian positional input indicates a position within the position limit, implementing a cursor control mode comprising providing the cartesian positional input to the processor to control the position of a cursor on the display screen.

34. A method according to claim 33 further comprising the steps of, in the keyboard simulation mode:
storing the key representation of the indicated key from the controller in a memory circuit in response to a key select input from a user used to select the indicated key, the memory circuit having an addressable memory space which simulates a mechanical keyboard;
scanning contents of the memory circuit with a keyboard controller to sense the stored representation of the selected key, the keyboard controller being adapted to scan columns of mechanical key contacts; and providing an input representative of the selected key to the keyboard input port.

35. The method of claim 33 wherein the position limit corresponds to a value on a cartesian coordinate axis.

36. The method of claim 35 further comprising switching between the cursor control mode and the keyboard simulation mode as a value in the cartesian positional input crosses the value corresponding to the position limit.

37. The method of claim 36 further comprising:
adapting the input device to be worn as a headset by the user; and
controlling the cartesian positional input by changing a position of the user's head.

* * * * *